April 1, 1930.  T. MIDGLEY  1,752,569

VULCANIZING PRESS

Filed May 31, 1927   2 Sheets-Sheet 1

INVENTOR.
Thomas Midgley
BY
Edward C. Naylor
ATTORNEY.

April 1, 1930.  T. MIDGLEY  1,752,569
VULCANIZING PRESS
Filed May 31, 1927  2 Sheets-Sheet 2

INVENTOR:
Thomas Midgley
BY Edward C. Naylor
ATTORNEY.

UNITED STATES PATENT OFFICE

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS

VULCANIZING PRESS

Application filed May 31, 1927. Serial No. 195,494.

This invention relates to individual vulcanizers for handling rubber articles and is especially adapted for the vulcanization of rubber inner tubes for pneumatic tires. One object of the invention is to improve the accessibility of molds of this general character with respect to the removal and replacement of the tubes. A further object is to permit the use of a simple and inexpensive mold which can be replaced at low cost and without the necessity of re-making any fluid connections in the heating chambers of the press. A further object is to increase the interchangeability of mold sizes in a single press.

Referring to the drawings.

Figure 1:
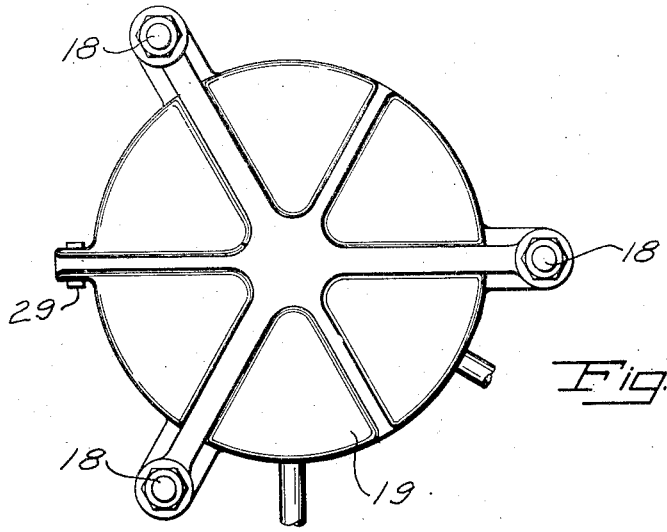
Fig. 1 is a top plan view of a press embodying my invention.

The press is mounted upon a base 10 formed with a hydraulic cylinder 11 in which runs the ram 12 which operates the press. An inlet 13 and an outlet 14 are connected to the cylinder in a convenient manner and a packing 15 seals the ram and the cylinder together.

Mounted upon the ram is a lower press platen 16 having guides 17 running upon rods 18 extending between the base and the upper press platen 19. Both platens are cored as at 20 for the reception of steam by which they are heated although other heating media may be used if desired. The platens have flanges 21 at their outer peripheries which are cored out as at 22 and are also provided with flanges 23 at a point within the circumference of the mold. By this means a heated recess is provided in each platen into which the mold halves are fitted as hereinafter described.

Figure 2:
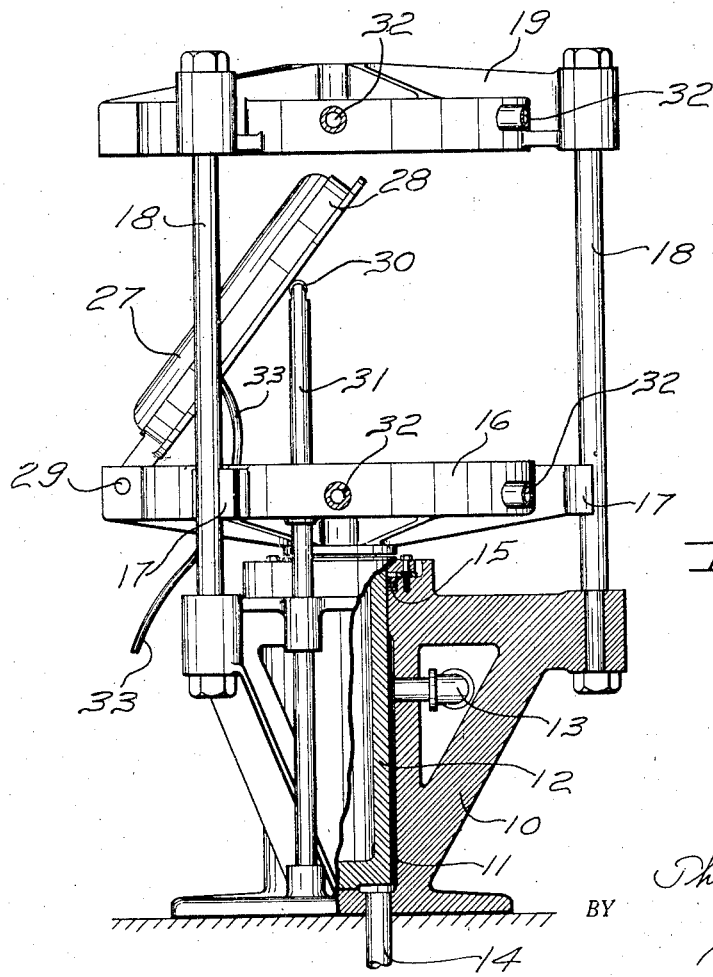
Fig. 2 is a side elevation thereof partly in section.

The upper mold half 24 is secured as by bolts 25 to the upper press platen and is provided with a concavity 26 for receiving the tube 27. The lower mold half 28 is likewise concaved to receive the tube but instead of being fixed to the lower press platen it is pivoted at one side as at 29. Rollers 30, attached to rods 31 which pass freely through holes in the lower platen, bear upon the lower surface of the pivoted mold half to cause it to tilt upwardly when the platens are separated as shown in Fig. 2. The mold halves are preferably made of aluminum in order to utilize the high heat conductivity of this material.

Figure 4:
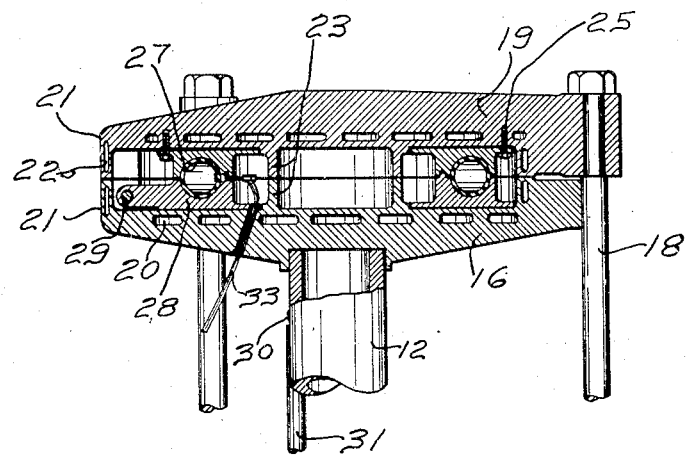
Fig. 4 is a similar view showing the press entirely closed.

The platens are provided with steam connections 32 or other means for supplying the desired heating media to them so that when the platens are closed together as in Fig. 4 the mold halves are entirely surrounded by circulating steam. An air line 33 passing through a hole 34 in the lower platen is connected to the valve 35 of the tube so that during vulcanization the tube may be expanded outwardly into the mold by fluid pressure.

Figure 3:
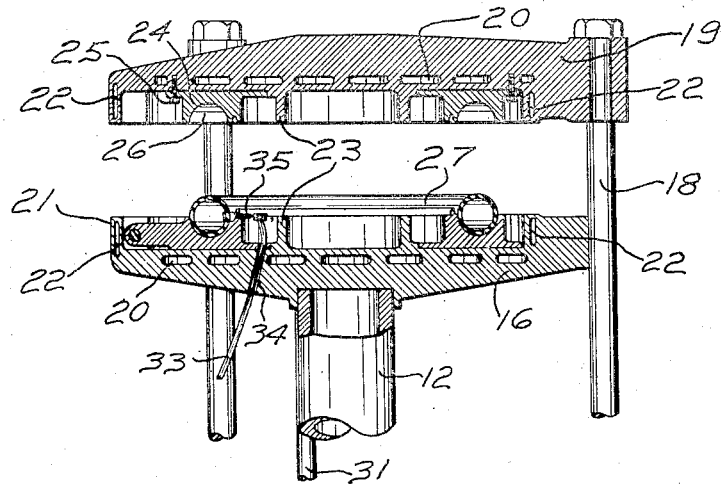
Fig. 3 is a section showing the press in a partially closed condition.

With the parts in the position of Fig. 2 a tube 27 may be placed in the concavity of the lower mold half, which is tilted at this time to facilitate the placing of the tube. The air line 33 is connected to the tube valve and water admitted under the ram 12 to cause the lower platen to rise. The rod 31 being stationary permits the lower mold half to assume gradually a horizontal position during the upward travel of the lower press platen, and at a time shortly before the platens come together as indicated in Fig. 3 the lower mold half has seated completely within the recess formed in the lower platen. During the further upward travel of the lower press platen the lower mold half carried thereby moves directly against the upper mold half without any further tilting motion.

Figure 5:
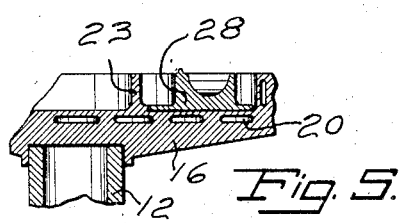
Figs. 5 and 6 are details of the lower press platen illustrating the manner of interchanging mold sizes.
Figure 6:
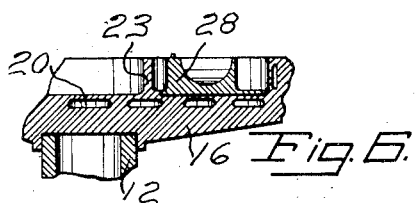

By reason of the described construction the mold halves can be replaced with others of different sizes, as indicated in Figs. 5 and 6 without the necessity of changing any steam connections or packing any fluid tight joints. The recesses in the press platens are large enough so that variations in the major diameter of the mold can be made without any change in the recesses formed in the platens. Variations in the cross-sectional diameter of the tube receiving concavity are obtained by varying the amount of metal in the mold between the concave and the surface of the cylinder. These features are clearly indicated by a comparison of Figs. 5 and 6 which show different sizes of molds applied to the lower platen.

Having thus described my invention, I claim:

1. A vulcanizing press comprising heated horizontal platens each formed with a mold receiving recess, a mold half fixed in the recess of the upper platen, a second mold half pivotally connected at one side to the lower platen so as to lie in the recess thereof, means for moving the lower platen towards and away from the upper platen, fixed rods passing through the lower platen, and rolls secured on the rods and bearing against the lower mold half at a point remote from the pivot whereby the lower mold half will be tilted from a horizontal towards a vertical position as the lower platen descends.

2. A vulcanizing press comprising upper and lower platens, a mold half fixed to the upper platen, a mold half pivoted at one side to the lower platen, means for moving the platens towards and away from each other, and means for tilting the lower mold half around its pivot as the platens separate.

THOMAS MIDGLEY.